Aug. 18, 1925.
J. E. O'KEEFE
ARTIFICIAL BAIT
Filed July 28, 1924
1,549,792
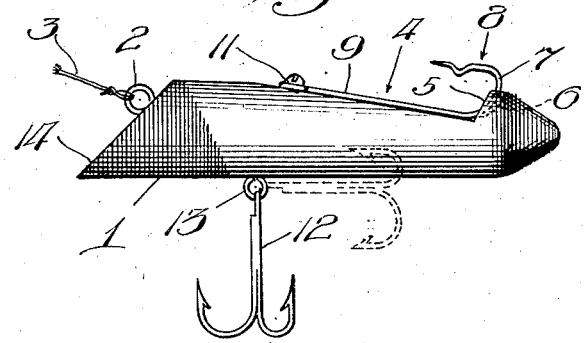
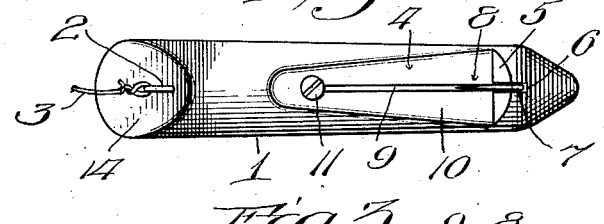
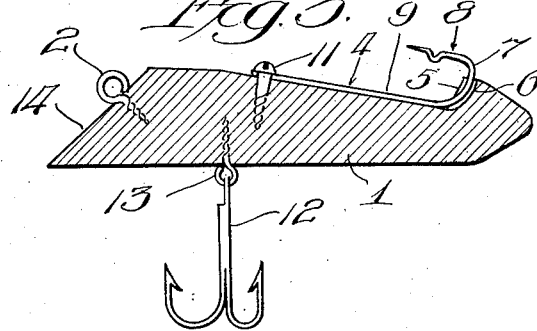
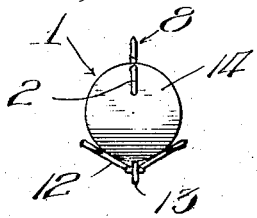
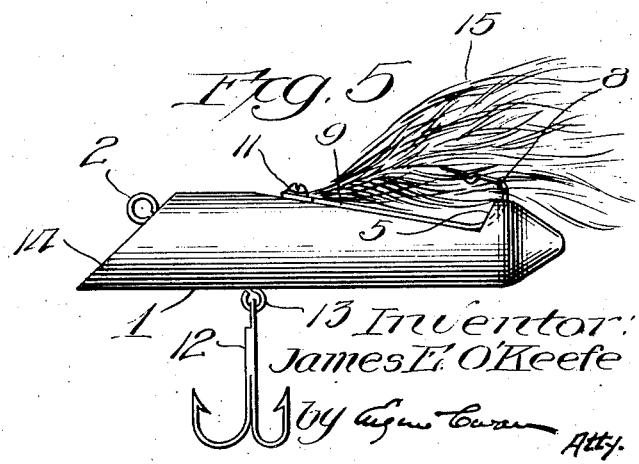
Inventor:
James E. O'Keefe Patented Aug. 18, 1925.

1,549,792

UNITED STATES PATENT OFFICE.

JAMES EDWIN O'KEEFE, OF CHICAGO, ILLINOIS.

ARTIFICIAL BAIT.

Application filed July 28, 1924. Serial No. 728,647.

*To all whom it may concern:*

Be it known that I, JAMES E. O'KEEFE, a citizen of the United States, residing at Chicago, in the county of Cook and State of Illinois, have invented new and useful Improvements in Artificial Bait, of which the following is a specification.

This invention relates to artificial bait and the like and consists in the matters hereinafter described and claimed.

In the accompanying drawings—

Fig. 1 is a side view of a bait of my invention;

Fig. 2 is a top view of the same;

Fig. 3 is a longitudinal sectional view;

Fig. 4 is an end view; and

Fig. 5 shows a fly attached.

My improved bait has an elongated plug or body 1 preferably made of wood or other material for floating and lightness in weight for casting. In cross-section the plug 1 is substantially cylindrical and is tapered or given a general conical shape to have one end smaller than the other. The smaller end of the plug is its rear end, there being an eye or like member 2 at its front or larger end for attachment to a fishing line, as at 3.

The top of the plug 1 is cut away or otherwise formed to provide an inclined recess 4 extending lengthwise of the plug. This recess is deepest at the rear or smaller end of the plug and there meets an upstanding shoulder 5, in which is a slot 6 to receive the looped end 7 of a fish-hook 8. The shank 9 of the hook lies against the inclined bottom surface 10 of the recess and extends toward the rear or larger end of the plug, where it is secured thereto by a screw or like member 11, as shown.

A gang hook 12 (barbed or barbless) is attached to the under side of the plug 1 by a screw-eye 13, so that in packing or nesting with other baits, the gang hook may be swung up against the plug, as shown in dotted lines in Fig. 1. The gang hook 12 is preferably located forward of the screw 11 so as not to hinder the fish when attempting to swallow the plug from its smaller end. The front end of the plug 1 is cut or provided with an upwardly inclined face 14 to force the plug under water and keep it submerged when drawn forward through the water by the line 3. The eye 2 is located above the center line of the plug so that the force of the water acts against the pull on line 3 to hold the plug completely submerged.

Seating the pointed end of the hook 8 at the deepest end of the recess 4 brings the pointed end of the hook closely adjacent the body of the plug, so that the hook may readily pass into the mouth of the fish when attempting to swallow the plug from its rear end. The hook 8 may be of the barbless type, as shown, so as not to tear the mouth of the fish when caught thereon. The slot 6 holds the hook 8 from shifting on the plug and thus lessens the chance of the fish escaping from the hook when caught.

The plug 1 may be painted any color or colors desired, or be otherwise treated to act as a lure. Being generally tapered, it resembles a minnow or smaller fish when drawn through the water, and is small enough at its rear end for game fish to readily take the same in its mouth when striking the bait. The pointed end of the hook extends toward the front end of the plug so that it may readily pass into the fish's mouth when taking the bait.

Figure 5 shows the plug 1 provided with a fly or feather 15 extending over the hook 8.

I claim as my invention:

1. An artificial bait, comprising an elongated plug made smaller at one end than the other, said plug having an inclined recess extending lengthwise thereof with the deepest end of the recess adjacent the smaller end of the plug, and a fish-hook seated in said recess and secured to the plug with the pointed end of the hook normally extending beyond the plug from the deepest end of said recess.

2. An artificial bait, comprising a generally tapered plug, said plug being cut away between its ends to provide an inclined recess extending lengthwise of the plug with the deepest end of the recess adjacent the smaller end of the plug, and ending at a shoulder in the plug, and a fish hook seated in said recess with its pointed end extending out of the same and with its looped portion in a slot in said shoulder.

In testimony that I claim the foregoing as my invention, I affix my signature this 22 day of July, 1924.

JAMES EDWIN O'KEEFE.